US012597080B2

(12) United States Patent
Shen

(10) Patent No.: US 12,597,080 B2
(45) Date of Patent: Apr. 7, 2026

(54) DRILLING ACTIVITY RECOMMENDATION SYSTEM AND METHOD

(71) Applicant: Schlumberger Technology Corporation, Sugar Land, TX (US)

(72) Inventor: Tao Shen, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/613,178

(22) Filed: Mar. 22, 2024

(65) Prior Publication Data

US 2024/0233047 A1 Jul. 11, 2024

Related U.S. Application Data

(63) Continuation of application No. 17/755,091, filed as application No. PCT/CN2019/113675 on Oct. 28, 2019, now Pat. No. 11,989,790.

(51) Int. Cl.
| | |
|---|---|
| *G06Q 50/00* | (2024.01) |
| *E21B 41/00* | (2006.01) |
| *G06Q 10/0637* | (2023.01) |
| *G06Q 50/02* | (2012.01) |
| *E21B 7/04* | (2006.01) |
| *E21B 43/00* | (2006.01) |
| *G06Q 10/0631* | (2023.01) |

(52) U.S. Cl.
CPC ............. *G06Q 50/02* (2013.01); *E21B 41/00* (2013.01); *G06Q 10/0637* (2013.01); *E21B 7/04* (2013.01); *E21B 43/00* (2013.01); *G06Q 10/06312* (2013.01)

(58) Field of Classification Search
CPC .............. G06Q 50/02; G06Q 10/0637; G06Q 10/06312; G06Q 10/0631; E21B 41/00; E21B 7/04; E21B 43/00
See application file for complete search history.

(56) References Cited

U.S. PATENT DOCUMENTS

| | | | |
|---|---|---|---|
| 5,139,094 | A | 8/1992 | Prevedel |
| 5,680,906 | A | 10/1997 | Andrieux |
| 5,899,958 | A | 5/1999 | Dowell |
| 5,992,519 | A | 11/1999 | Ramakrishnan |
| 6,266,619 | B1 | 7/2001 | Thomas |

(Continued)

*Primary Examiner* — Rutao Wu
*Assistant Examiner* — Tyrone E Singletary
(74) *Attorney, Agent, or Firm* — Kyle R. Miiller

(57) ABSTRACT

A method for planning a well that include receiving an initial drill plan and a current recommendation of a sequence of activities for drilling a target well. The method also include analyzing the initial drill plan and selecting a subject activity of the initial drill plan. The method additionally include analyzing the current recommendation and determining a sequence of activities including a prior activity that is prior to the subject activity from the current recommendation, wherein the sequence of activities include one or more drilling activities that occur between the prior activity and the subject activity that are determined based on a conditional probability of an occurrence. The method further include analyzing the sequence of the activities and determining a path that represents the one or more drilling activities, wherein the initial drill plan is augmented based on the path and generated into a modified drill plan for drilling the target well.

17 Claims, 14 Drawing Sheets

(56)  References Cited

U.S. PATENT DOCUMENTS

| | | | |
|---|---|---|---|
| 6,313,837 B1 | 11/2001 | Assa | |
| 6,980,940 B1 | 12/2005 | Gurpinar | |
| 7,003,439 B2 | 2/2006 | Aldred | |
| 7,079,952 B2 | 7/2006 | Thomas | |
| 7,878,268 B2 | 2/2011 | Chapman | |
| 8,985,242 B2 | 3/2015 | Samuel | |
| 10,332,219 B2 | 6/2019 | Colvin | |
| 11,333,006 B2 | 5/2022 | Johnston | |
| 11,391,143 B2* | 7/2022 | Johnston | E21B 7/04 |
| 2003/0168257 A1 | 9/2003 | Aldred | |
| 2003/0216897 A1 | 11/2003 | Endres | |
| 2004/0122640 A1 | 6/2004 | Dusterhoft | |
| 2004/0220846 A1 | 11/2004 | Cullick | |
| 2005/0149307 A1 | 7/2005 | Gurpinar | |
| 2005/0194182 A1 | 9/2005 | Rodney | |
| 2005/0209836 A1 | 9/2005 | Klumpen | |
| 2005/0209886 A1 | 9/2005 | Corkern | |
| 2005/0209912 A1* | 9/2005 | Veeningen | G06Q 10/10 |
| | | | 705/7.12 |
| 2005/0211468 A1 | 9/2005 | Veeningen | |
| 2005/0228905 A1 | 10/2005 | Veeningen | |
| 2005/0236184 A1 | 10/2005 | Veeningen | |
| 2005/0267719 A1 | 12/2005 | Foucault | |
| 2006/0197759 A1 | 9/2006 | Fremming | |
| 2007/0199721 A1* | 8/2007 | Givens | G06Q 10/06 |
| | | | 166/382 |
| 2007/0282774 A1* | 12/2007 | Bouzas | G06Q 10/06375 |
| | | | 706/45 |
| 2008/0262810 A1 | 10/2008 | Moran | |
| 2008/0289875 A1 | 11/2008 | Burge | |
| 2008/0306803 A1 | 12/2008 | Vaal | |
| 2009/0152005 A1* | 6/2009 | Chapman | E21B 44/00 |
| | | | 702/9 |
| 2010/0082142 A1 | 4/2010 | Usadi | |
| 2010/0191516 A1 | 7/2010 | Benish | |
| 2011/0153300 A1 | 6/2011 | Holl | |
| 2011/0161133 A1 | 6/2011 | Staveley | |
| 2011/0172976 A1 | 7/2011 | Budiman | |
| 2013/0103441 A1* | 4/2013 | Doganata | G06Q 10/06 |
| | | | 705/7.12 |
| 2013/0140037 A1 | 6/2013 | Sequeira, Jr. | |
| 2013/0218568 A1 | 8/2013 | Tamura | |
| 2013/0341093 A1 | 12/2013 | Jardine | |
| 2014/0005996 A1 | 1/2014 | Jain | |
| 2014/0110167 A1* | 4/2014 | Goebel | G06N 20/10 |
| | | | 175/24 |
| 2014/0143376 A1 | 5/2014 | Beaulac | |
| 2014/0195215 A1 | 7/2014 | Chen | |
| 2014/0309978 A1 | 10/2014 | Chen | |
| 2015/0039281 A1 | 2/2015 | Meyer | |
| 2015/0073760 A1 | 3/2015 | Sachidanandam | |
| 2017/0147709 A1 | 5/2017 | Ganz | |
| 2017/0335662 A1* | 11/2017 | Torrado | E21B 41/00 |
| 2018/0087321 A1 | 3/2018 | Johnston | |
| 2022/0358604 A1 | 11/2022 | Shen | |

* cited by examiner

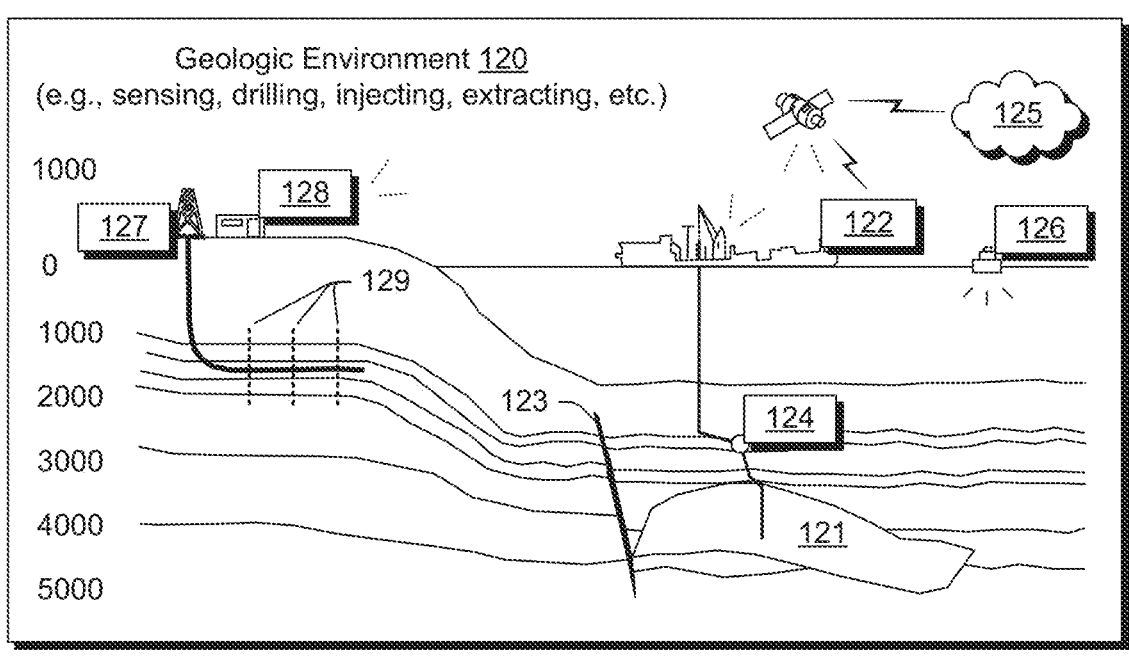
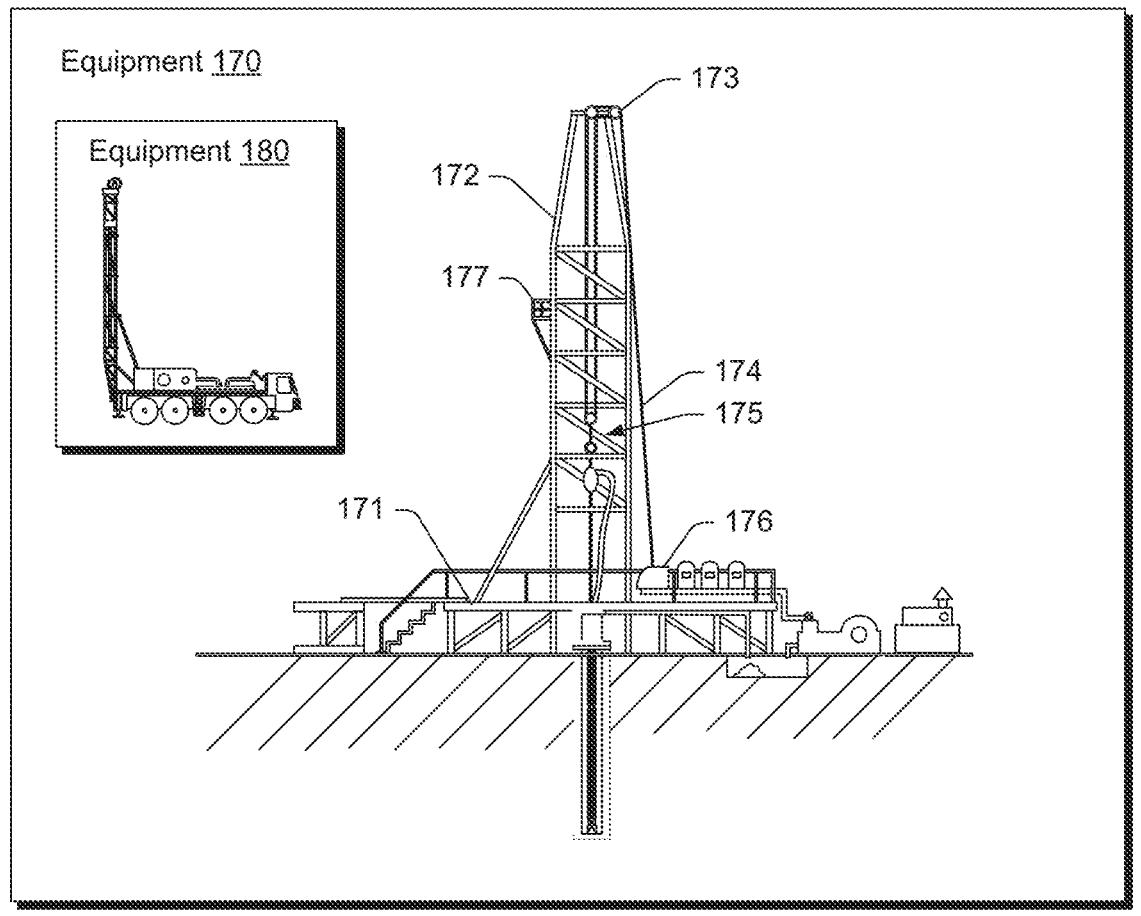
FIG. 1

System 300

500

700

704

708

702

100

0

0

706

800

Select an offset well drilling activity log — 802

Partition the offset well drilling activity log into fragments of one or more activities — 804

Generate a tree structure using the fragments — 806

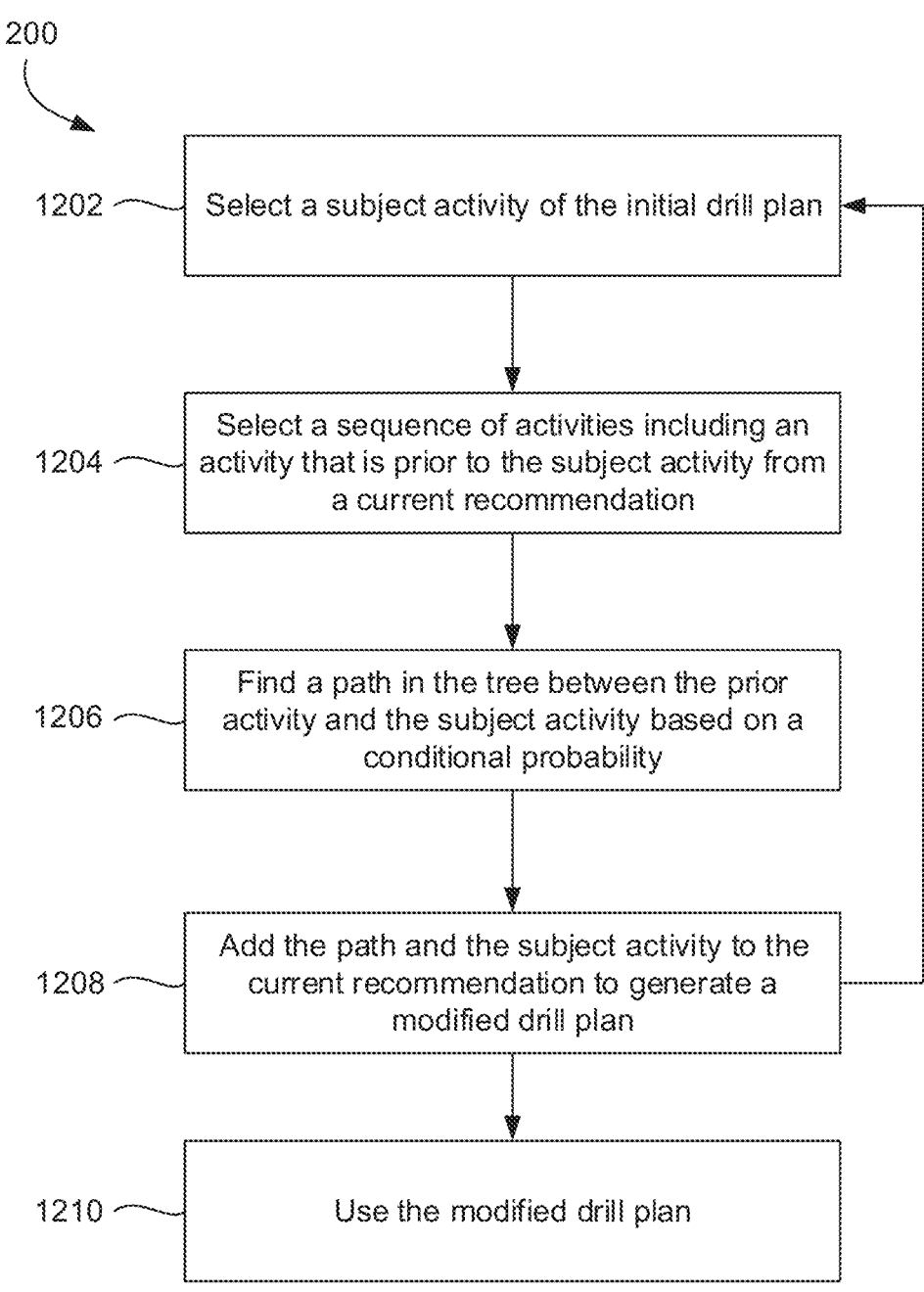

1200

1202 — Select a subject activity of the initial drill plan

1204 — Select a sequence of activities including an activity that is prior to the subject activity from a current recommendation 1206 — Find a path in the tree between the prior activity and the subject activity based on a conditional probability 1208 — Add the path and the subject activity to the current recommendation to generate a modified drill plan 1210 — Use the modified drill plan

FIG. 12

DRILLING ACTIVITY RECOMMENDATION SYSTEM AND METHOD

RELATED APPLICATIONS

This application is a continuation of, and claims priority to, U.S. application Ser. No. 17/755,091 filed 21 Apr. 2022, published as US 2022-0358604, now U.S. Pat. No. 11,989, 790, which was a National Stage of International Application No. PCT/CN2019/113675 filed on 28 Oct. 2019, all of which are incorporated by reference herein in their entirety.

BACKGROUND

In the oil and gas field, drill plans are generated to provide guidance for drilling operations. The goal of the drill plan includes providing a sequence of activities that leads to the creation of a well that meets desired specifications for geometry, trajectory, etc., and is drilled efficiently.

Drill plans leverage drilling knowledge gained by experience in drilling other wells, sometimes referred to as offset wells. However, in many practical applications, the drill plans are incomplete, and may result in the drilling operators improvising to move between successive activities. This leaves the process open to subjectivity and human error.

SUMMARY

According to one aspect, a method for planning a well may include receiving an initial drill plan and a current recommendation of a sequence of activities for drilling a target well. The method may also include analyzing the initial drill plan and selecting a subject activity of the initial drill plan. The method may additionally include analyzing the current recommendation and determining a sequence of activities including a prior activity that is prior to the subject activity from the current recommendation. The sequence of activities include one or more drilling activities that occur between the prior activity and the subject activity that are determined based on a conditional probability of an occurrence. The method may further include analyzing the sequence of the activities and determining a path that represents the one or more drilling activities. The initial drill plan is augmented based on the path and generated into a modified drill plan for drilling the target well.

According to another aspect, a system for planning a well of one or more processors that includes a memory system including one or more non-transitory, computer-readable media storing instructions that, when executed by at least one of the one or more processors, cause a computing system to perform operations. The operations may include receiving an initial drill plan and a current recommendation of a sequence of activities for drilling a target well. The operations may also include analyzing the initial drill plan and selecting a subject activity of the initial drill plan and analyzing the current recommendation and determining a sequence of activities including a prior activity that is prior to the subject activity from the current recommendation. The sequence of activities include one or more drilling activities that occur between the prior activity and the subject activity that are determined based on a conditional probability of an occurrence. The operations may further include analyzing the sequence of the activities and determining a path that represents the one or more drilling activities, wherein the initial drill plan is augmented based on the path and generated into a modified drill plan for drilling the target well.

According to yet another aspect, a non-transitory computer-readable storage medium storing instructions that when executed by a computer, which includes a processor performs a method. The method may include receiving an initial drill plan and a current recommendation of a sequence of activities for drilling a target well. The method may additionally include analyzing the initial drill plan and selecting a subject activity of the initial drill plan and analyzing the current recommendation and determining a sequence of activities including a prior activity that is prior to the subject activity from the current recommendation. The sequence of activities include one or more drilling activities that occur between the prior activity and the subject activity that are determined based on a conditional probability of an occurrence. The method may further include analyzing the sequence of the activities and determining a path that represents the one or more drilling activities. The initial drill plan is augmented based on the path and generated into a modified drill plan for drilling the target well.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates equipment in a geologic environment, according to an embodiment.

FIG. 12 illustrates a flowchart of a procedure for applying the offset well drilling run statistical tree to modify a drill plan, according to an embodiment.

DETAILED DESCRIPTION

Figure 2:
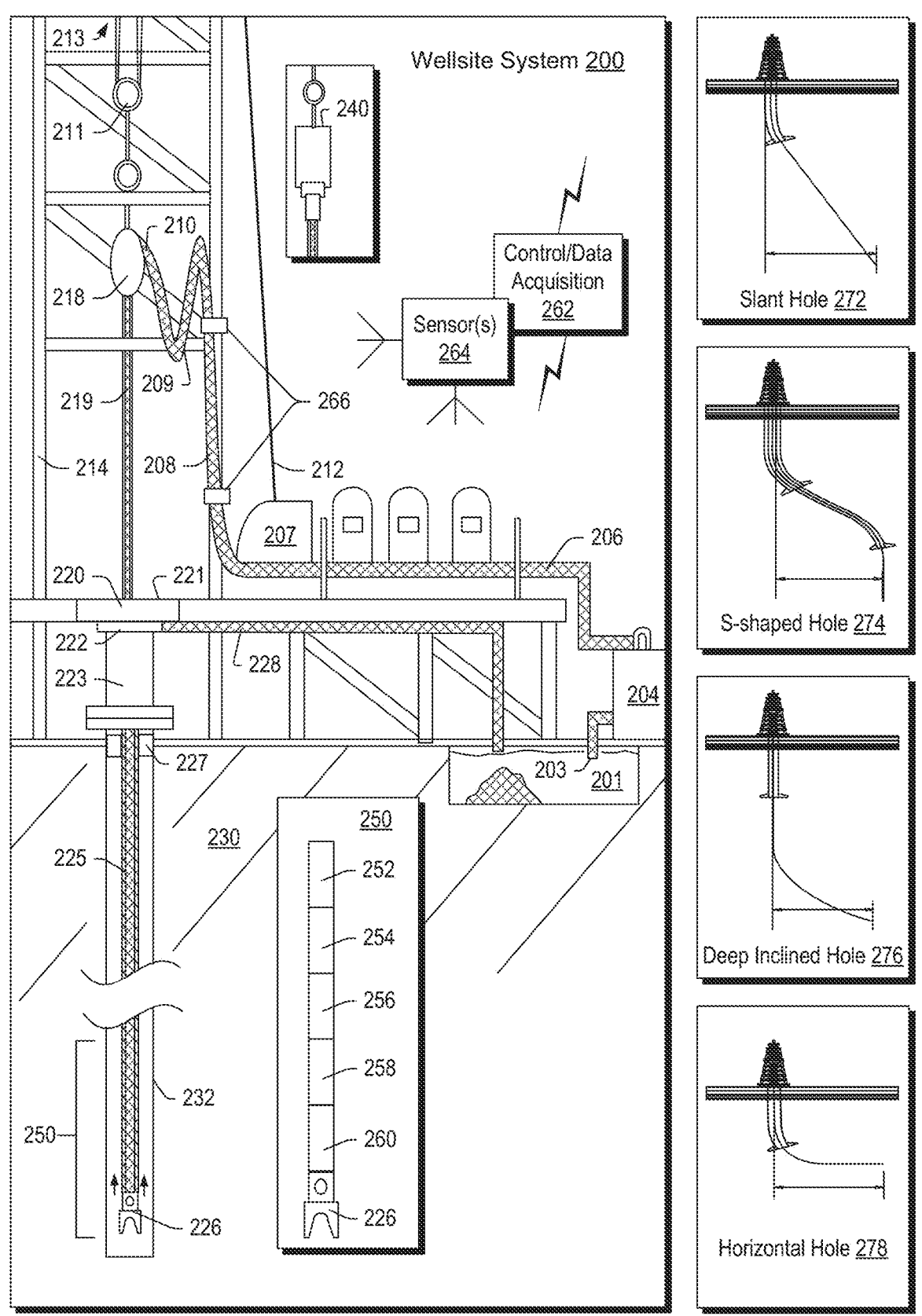
FIG. 2 illustrates a wellsite or drilling system and examples of types of wellbores, according to an embodiment.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). One or more other constraints may be imposed, for example, consider one or more constraints germane to capabilities of tools being used and/or one or more constraints related to drilling time and risk tolerance.

A well plan can be generated based at least in part on imposed constraints and known information. As an example, a well plan may be provided to a well owner, approved, and then implemented by a drilling service provider (e.g., a directional driller or "DD").

A well design system can account for one or more capabilities of a drilling system or drilling systems that may be utilized at a wellsite. As an example, a drilling engineer may be called upon to take such capabilities into account, for example, as one or more of various designs and specifications are created.

A well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

FIG. 1 illustrates a schematic view of an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

A crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

A derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkey-board) to reach pipe located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

Mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

Telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

The drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the MWD module 256 of the drillstring assembly 250. Where the position of an LWD module is mentioned, as an example, it may refer to a module at the position of the LWD module 254, the MWD module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 256 may include equipment for generating electrical power, for example, to power various components of the drillstring 225. As an example, the MWD tool 256 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the term can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
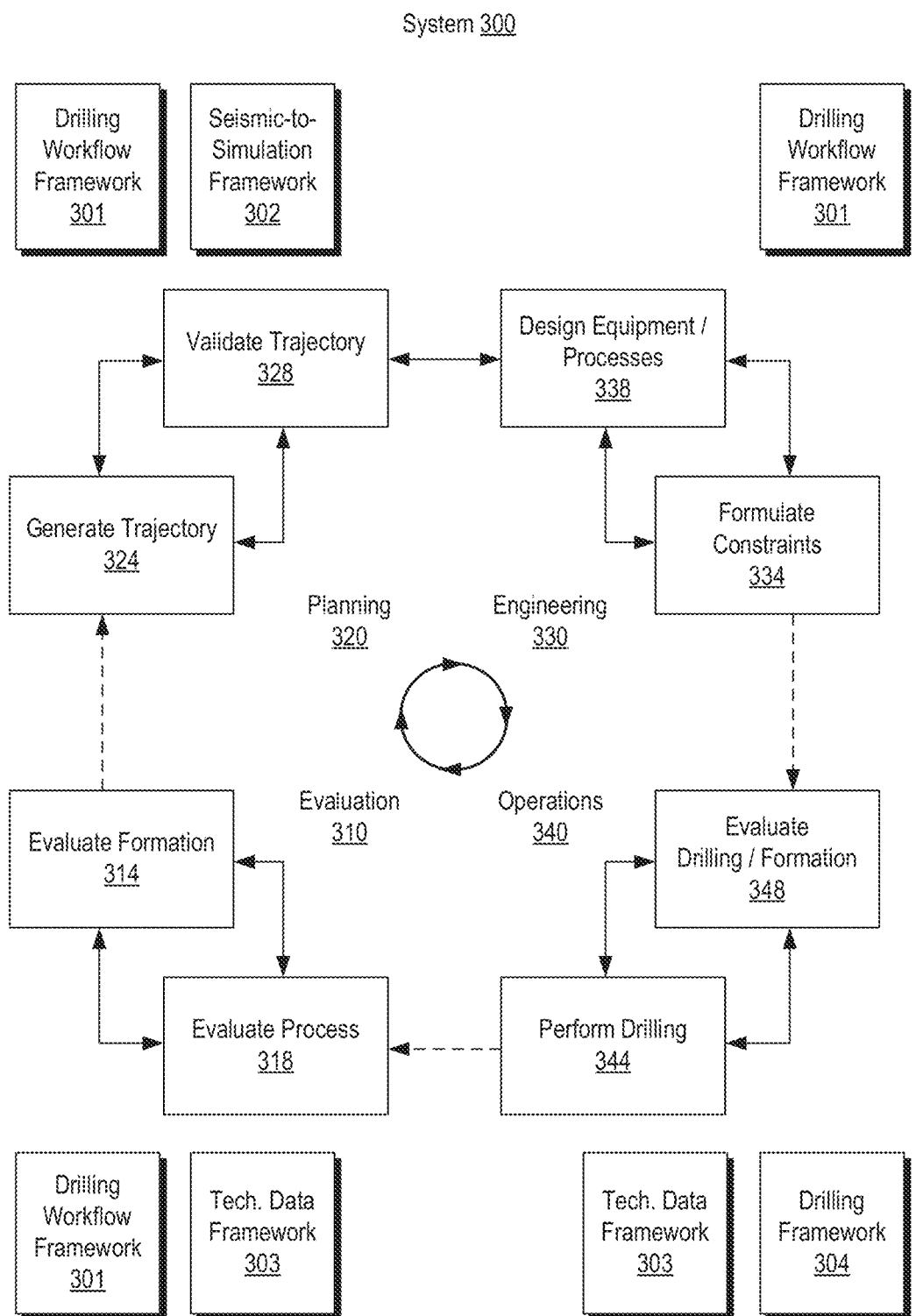
FIG. 3 illustrates a block diagram of a drilling system, according to an embodiment.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Texas) and the technical data framework 303 can be, for example, the TECHLOG® framework (Schlumberger Limited, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ NET™ framework (Redmond, Washington), which provides a set of extensible object classes. In the .NET™ framework, an object class encapsulates a module of reusable code and associated data structures. Object classes can be used to instantiate object instances for use in a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Texas), the INTERSECT® reservoir simulator (Schlumberger Limited, Houston Texas), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Texas), which allows for integration of add-ons (or plug-ins) into a PETREL® framework workflow. The OCEAN® framework environment leverages .NET™ tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Texas) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
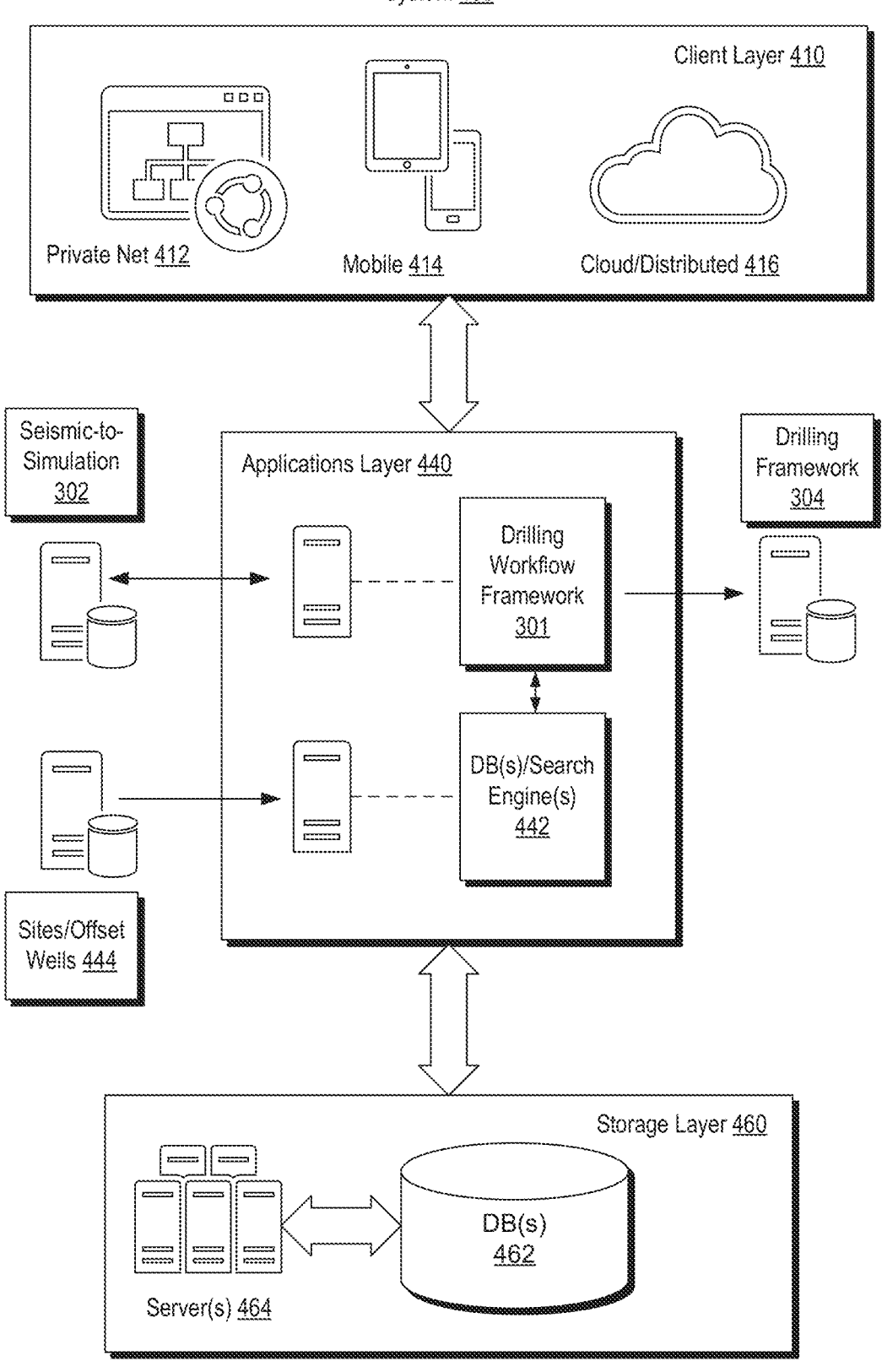
FIG. 4 illustrates a block diagram of another drilling system, according to an embodiment.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Texas) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 120 of FIG. 1) using one or more types of equipment (see, e.g., equipment of FIGS. 1 and 2).

Introduction to a Method for Generating a Modified Drill Plan

Figure 5:
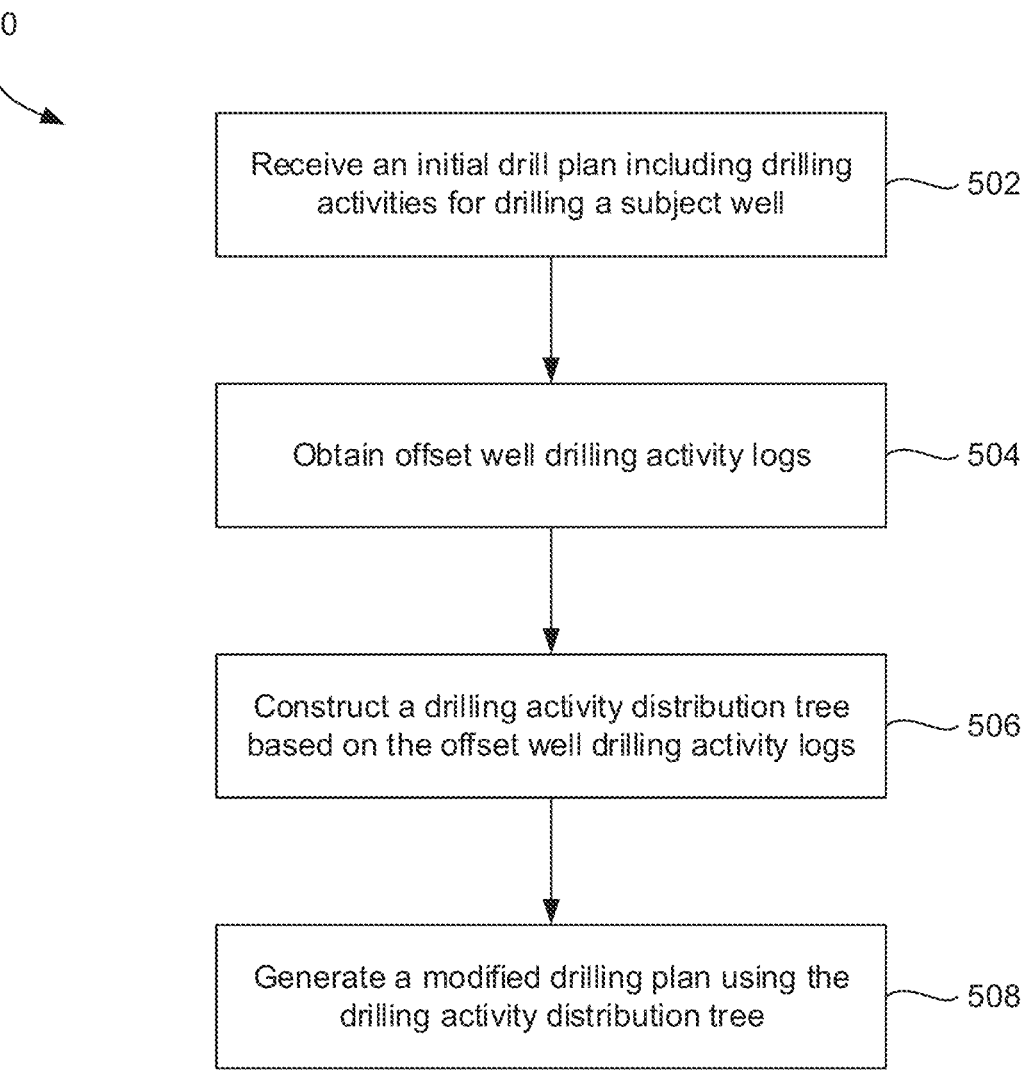
FIG. 5 illustrates a flowchart of a method for creating a drill plan, according to an embodiment.

FIG. 5 illustrates a simplified flowchart of a method 500 for creating a modified drill plan, e.g. for drilling a well, including, specifically, generating a modified drill plan that specifies drilling activities, according to an embodiment. The method 500 may include receiving an initial drill plan including drilling activities for drilling a subject well, as at 502. This is the base drill plan, which may be determined based on past experience, other drill plans for similar wells, etc. However, as mentioned above, despite efforts to provide a complete drill plan initially, the initial drill plan may have missing elements, which, if not filled in, may result in improvisation by drilling operators.

Accordingly, the method 500 may proceed to obtaining offset well drilling activity logs, as at 504. There are many processes for locating relevant offset drilling activity wells from libraries of offset well data, and any such process may be employed. Offset well drilling activity logs may be selected, for example, based on wellbore geometry or trajectory, formation similarity, locational proximity, etc.

Using the information collected from the offset well logs, a drilling activity distribution tree may be constructed, as at 506. This tree may be a statistical framework based on repeating patterns of activities identified within the offset well drilling activity logs. The tree may establish the likelihood of a subsequent activity being called for, based on an execution of past activities (i.e., the conditional probability of the subsequent activity, given the past activities). Thus, the tree may be used to determine if a sequence of activities in the initial drill plan is likely omitting one or more activities, determine what the missing activity likely is, and add it into the drill plan.

In this way, the method 500 may generate a modified drill plan using the drilling activity distribution tree, as at 508. That is, the method 500 may modify the initial drill plan, using the tree to fill in sequences of activities between prescribed activities in the initial drill plan, based on the historical patterns of activities in the offset well drill plans. The modified drill plan may then be used for drilling a well, in at least some embodiments.

Structure of the Drilling Activity Distribution Tree

Figure 6:
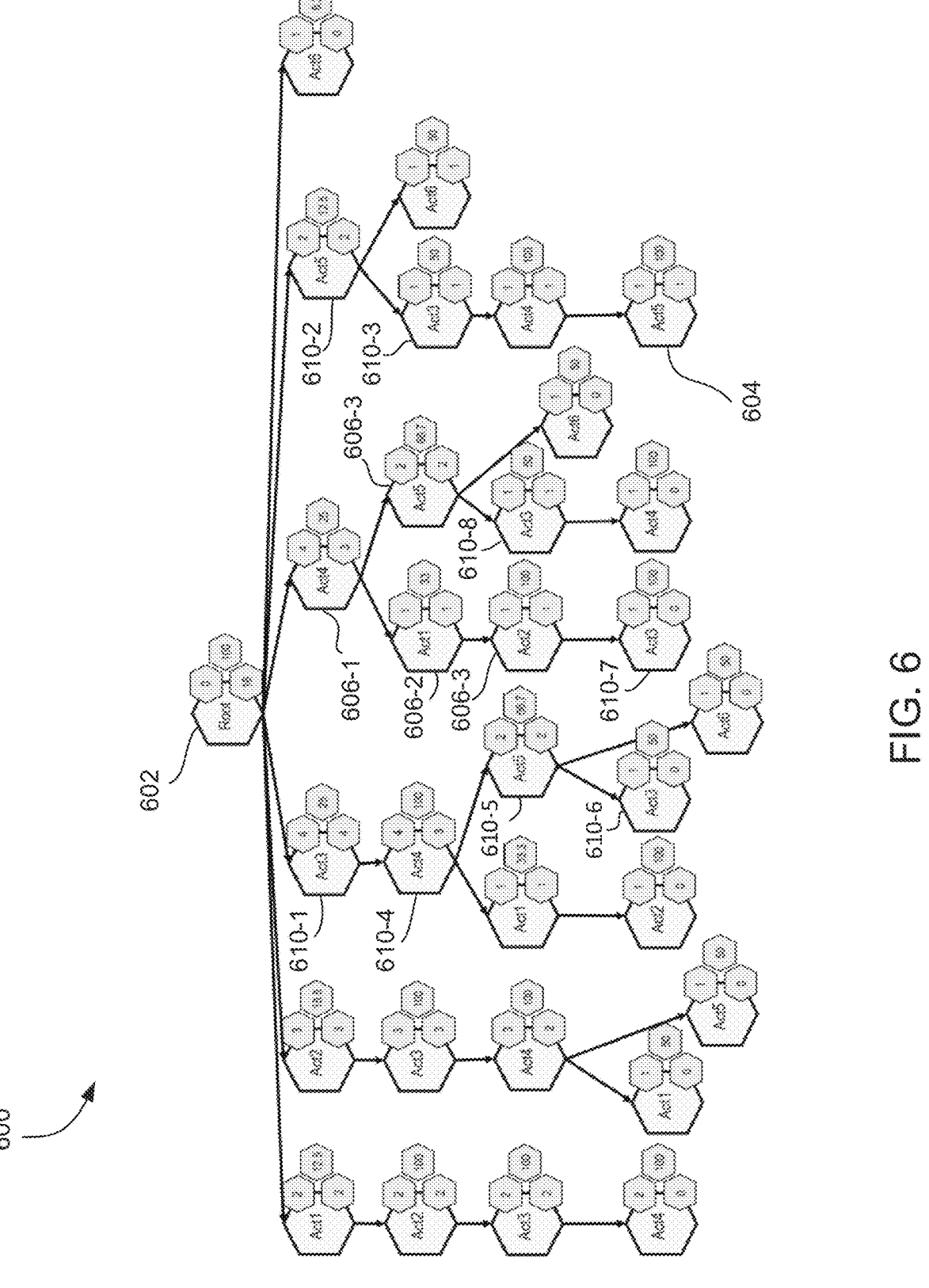
FIG. 6 illustrates an offset well drilling run statistical tree, according to an embodiment.

FIG. 6 illustrates a schematic view of a drilling activity distribution tree 600, according to an embodiment. Construction of the tree 600 will be discussed below. The elements of the constructed tree 600 include a root node 602, leaf nodes 604, and nodes 606 that connect the root node 602 to the leaf nodes 606. The nodes 606 may be arranged in parent-child relationships. For example, node 606-1 has two children (606-2, 606-3), and thus is referred to herein as the "parent" of "child" nodes 606-2, 606-3, while node 606-2 has a single child 606-4 and thus is the parent thereof. The root node 602 has no parent, and the leaf nodes 604 have no children. Accordingly, the parent-child relationships including the nodes 606 define paths to the respective leaf nodes 604, as is known in data structure art.

Figure 7:
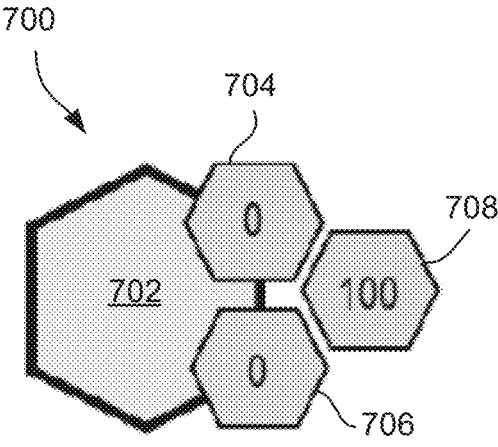
FIG. 7 illustrates a node of the offset well drilling run statistical tree, according to an embodiment.

FIG. 7 illustrates an example of a node 700, according to an embodiment. The nodes 602, 604, 606 may each include the components of the node 700 described herein and/or others. The node 700 may include data representing an activity 702, which may be an activity of the drill plan that is associated with the node 700. In the special case of the root node 602, the activity 702 may be NULL, as the root node 602 (FIG. 6) may not be associated with an activity.

The node 700 may also include three values associated with the probability of the node 700 occurring in a particular sequence: frequency 704, total children number 706, and probability 708. Frequency 704 may be the number of times the node 700 is encountered while building the tree using the offset well logs. For example, frequency 704 may be a counter that is incremented when the activity 702 is encountered in the sequence of which the node 700 is a part. For example, referring again to FIG. 6, the node 606-1 has a frequency 704 value of 4. Thus, while the tree 600 was being constructed, the node 606-1 was encountered (that is, the path from the root node 602 through the node 606-1 was traversed) four times.

Referring again to FIG. 7, the total children number 706 stores the number of times that the node 700 was reached, and was not representative of the last activity in the sequence. Thus, for node 606-1, the node 606-1 was reached four times (frequency=4), and was not the last node three times (total children number=3). It will be appreciated then that "total children number" does not refer to the total number of nodes that trace back to the root 602 via the node 700, which would be two, not three, in the example of the node 606-1.

The probability 708 is the frequency 704 divided by the total children number 706 of the parent node of the node 700 (not of the node 700 itself). Thus, referring again to FIG. 6 by way of example, the node 606-1 has a probability of 25%, because its frequency is four, and its parent node, the root node 602, has a total children number of 16 (4/16=25%). The node 606-2, by contrast, has a probability of 33.3%, because it has a frequency of one, and its parent node, node 606-1, has a total children number of three (1/3=33.3%). Note, this is a conditional probability. For example, the probability of node 606-2 represents the probability that node 606-2 follows node 606-1 given that node 606-1 is reached and is not the last node in the sequence.

Building the Drilling Activity Distribution Tree

Figure 8:
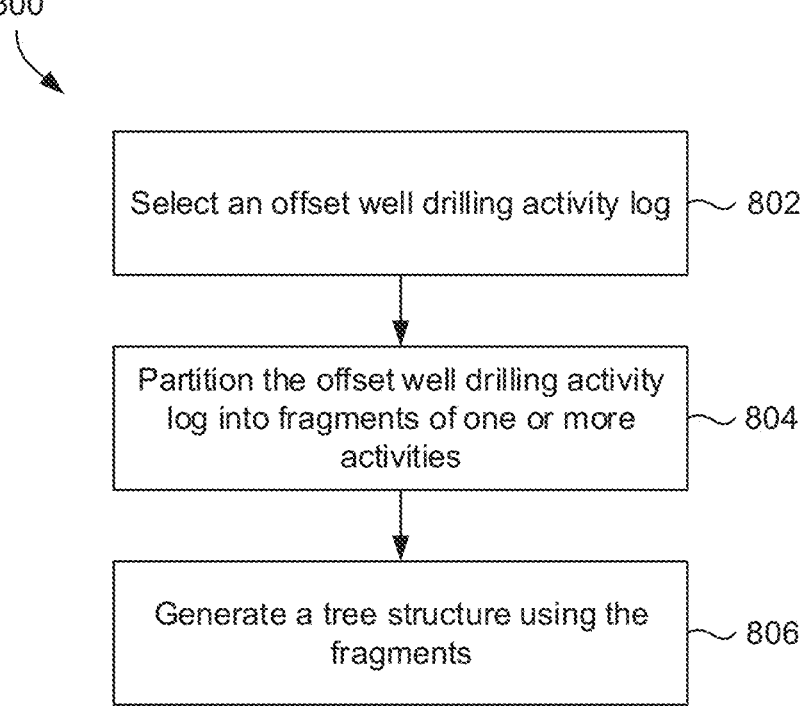
FIG. 8 illustrates a flowchart of a procedure for generating an offset well drilling run statistical tree, according to an embodiment.

Having discussed an example of the basic structure of the drilling activity distribution tree, an example tree-building process is now described with reference to FIG. 8, which shows a flowchart of a procedure 800 for building a drilling activity distribution tree, such as tree 600, according to an embodiment. As mentioned above, the tree 600 may be built based on offset drilling activity logs; thus, the procedure 800 may begin with or otherwise include selecting an offset well drill plan, as at 802. The offset drill plans may specify activities that were conducted, and the order in which they were conducted. Many various different types of drilling operations may be specified, as will be apparent to one of skill in the art. For the sake of illustration, two simple examples of drill plans are presented as follows:

Offset Drilling Activity Log #1: [Act1, Act2, Act3, Act4, Act1, Act2, Act3, Act4]

Offset Drilling Activity Log #2: [Act2, Act3, Act4, Act5, Act3, Act4, Act5, Act6]

To construct the tree 600, the sequence of activities of the offset well logs are parsed into fragments, e.g., using a sliding window of a specified size, as at 804. In one example, the window size is four activities wide, but any suitable length could be chosen, e.g., at the discretion of a user. After each fragment is selected, the window moves one space to the right, until the window is empty. Thus, the first fragment is the first four activities of log #1, the second fragment is the second through fifth activities of log #1, etc. As the window continues sliding, it eventually encompasses empty elements, after the conclusion of the drilling activity log. The result is shorter fragments, until the window is empty. The fragments formed from the Offset Drilling Activity Logs #1 and #2 are as follows:

| Fragment No. | Fragment Sequence |
|---|---|
| 1 | Act1, Act2, Act3, Act4 |
| 2 | Act2, Act3, Act4, Act5 |
| 3 | Act3, Act4, Act1, Act2 |
| 4 | Act4, Act1, Act2, Act3 |
| 5 | Act1, Act2, Act3, Act4 |
| 6 | Act2, Act3, Act4 |
| 7 | Act3, Act4 |
| 8 | Act4 |
| 9 | Act2, Act3, Act4, Act5 |
| 10 | Act3, Act4, Act5, Act3 |
| 11 | Act4, Act5, Act3, Act4 |
| 12 | Act5, Act3, Act4, Act5 |
| 13 | Act3, Act4, Act5, Act6 |

-continued

| Fragment No. | Fragment Sequence |
|---|---|
| 14 | Act4, Act5, Act6 |
| 15 | Act5, Act6 |
| 16 | Act6 |

Figure 9:
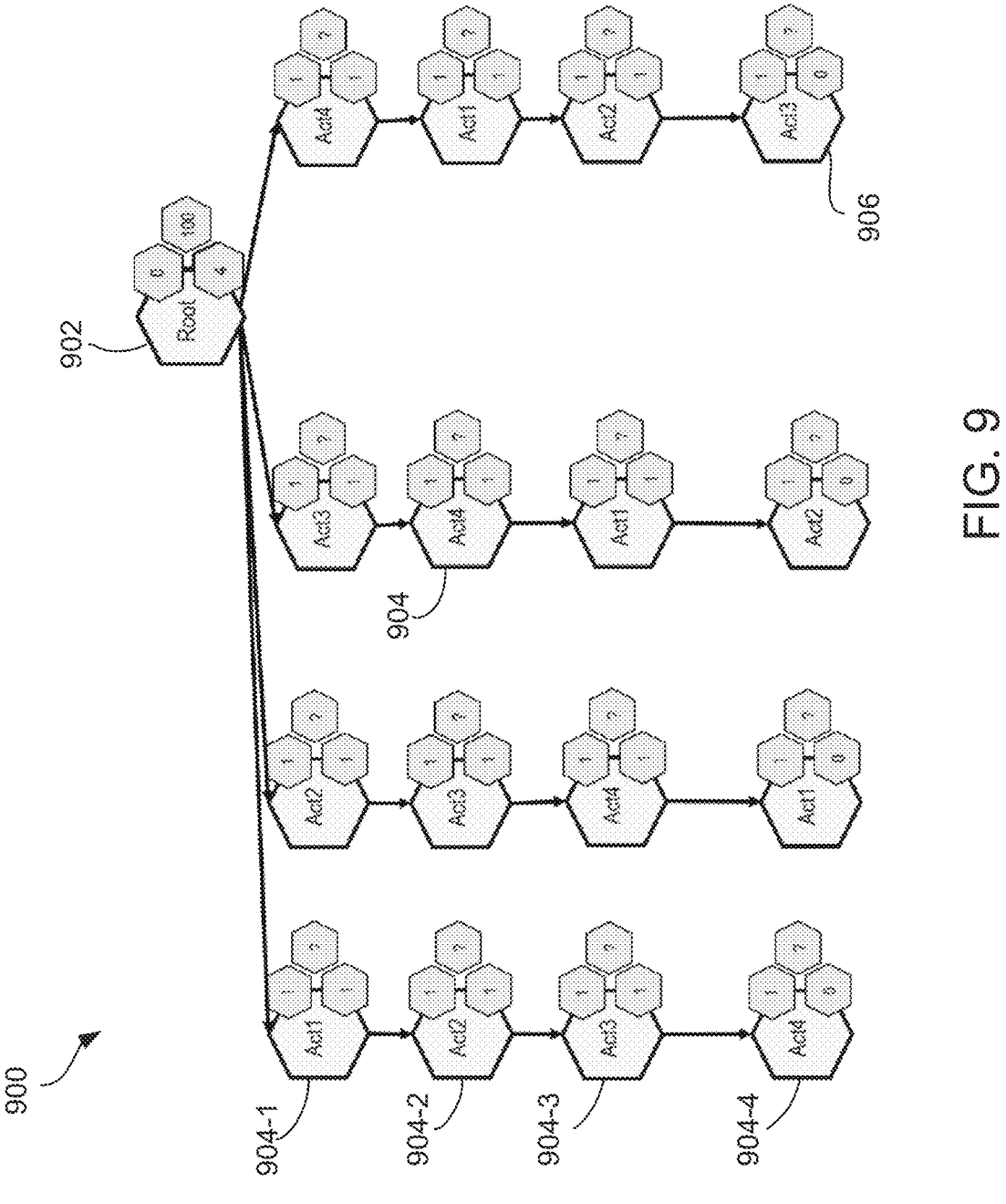
FIG. 9 illustrates an offset well drilling run statistical tree at a first stage of building the tree, according to an embodiment.

Nodes are then extracted from the fragments, and used to build a tree, as at 806. For example, the fragments from the above example may result in the tree 600. To aid in an understanding of how the tree 600 is constructed, a partial tree 900 is shown in FIG. 9. This tree 900 represents the first four fragments (note the total children number of the root node 902).

As noted above, each node 700 is associated with an activity, and, more particularly, with an activity that appears in a specific sequence in the fragments. Accordingly, nodes 904 of the tree 900 are populated using the activities as they appear in the sequence, using a root node 902 that is not associated with an activity as a common starting point.

For example, for fragment 1 from the table above, the first activity is Act1, and thus a new node 904-1 is associated with Act1 and is made a child of the root node 902 (line from the root node 902 to the node 904-1 indicates the parent-child relationship). The next activity in fragment 1 is Act2, and thus a new node 904-2 associated with Act2 is added to the tree 900 as a child of the node 904-1, and so on for the remaining activities of the fragment. Each new fragment begins again at the root node 902. Note, for the first four sequences, since none share a first activity in their sequence, each follows a different path of nodes 904 from the root node 902 to a separate leaf node 906. As such, the frequency of each of the nodes 904 (except for the root node 902) is one, as the sequences do not repeat any of the same paths.

Figure 10:
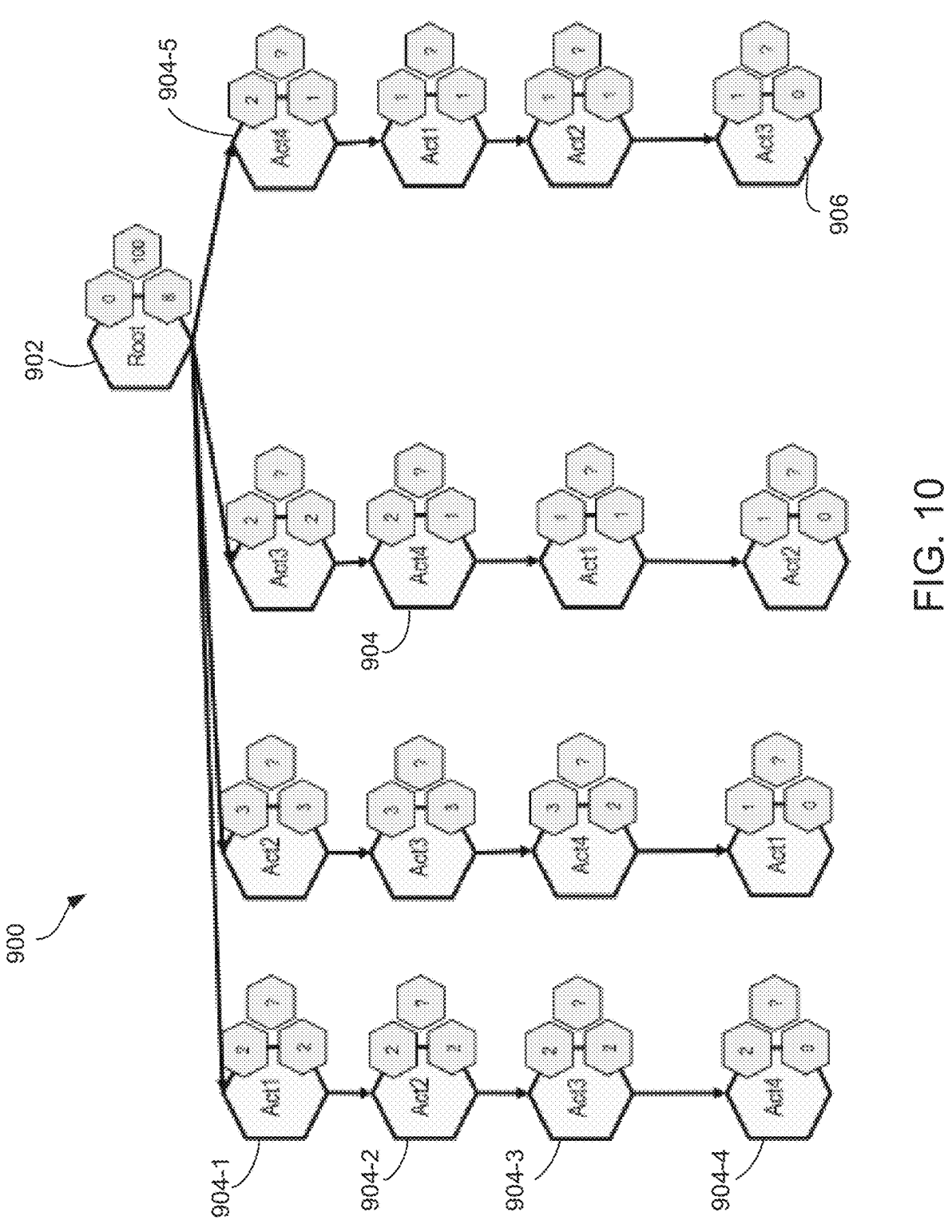
FIG. 10 illustrates the offset well drilling run statistical tree of FIG. 9, at a second stage of building, according to an embodiment.

Referring now to FIG. 10, fragments 5-8 are employed to build the tree 900 further, and, since each follows one of the established paths from the root node 902 to the leaf nodes 906, at least partially, the frequencies of the nodes 904 are updated accordingly, but no new nodes are added. Note that the frequencies and total children numbers of the nodes 904 on the various paths no longer match. For example, fragment 8 has a single activity: Act4. Thus, the fragment is stored in the tree as root node 902 and node 904-5. From a previous fragment, node 904-5 is part of a longer path, but fragment 8 does not include the remaining activities of this sequence. Thus, the frequency of node 904-5 is incremented, but not its total children number, nor the frequencies of its child node, grand-child, etc.

Figure 11:
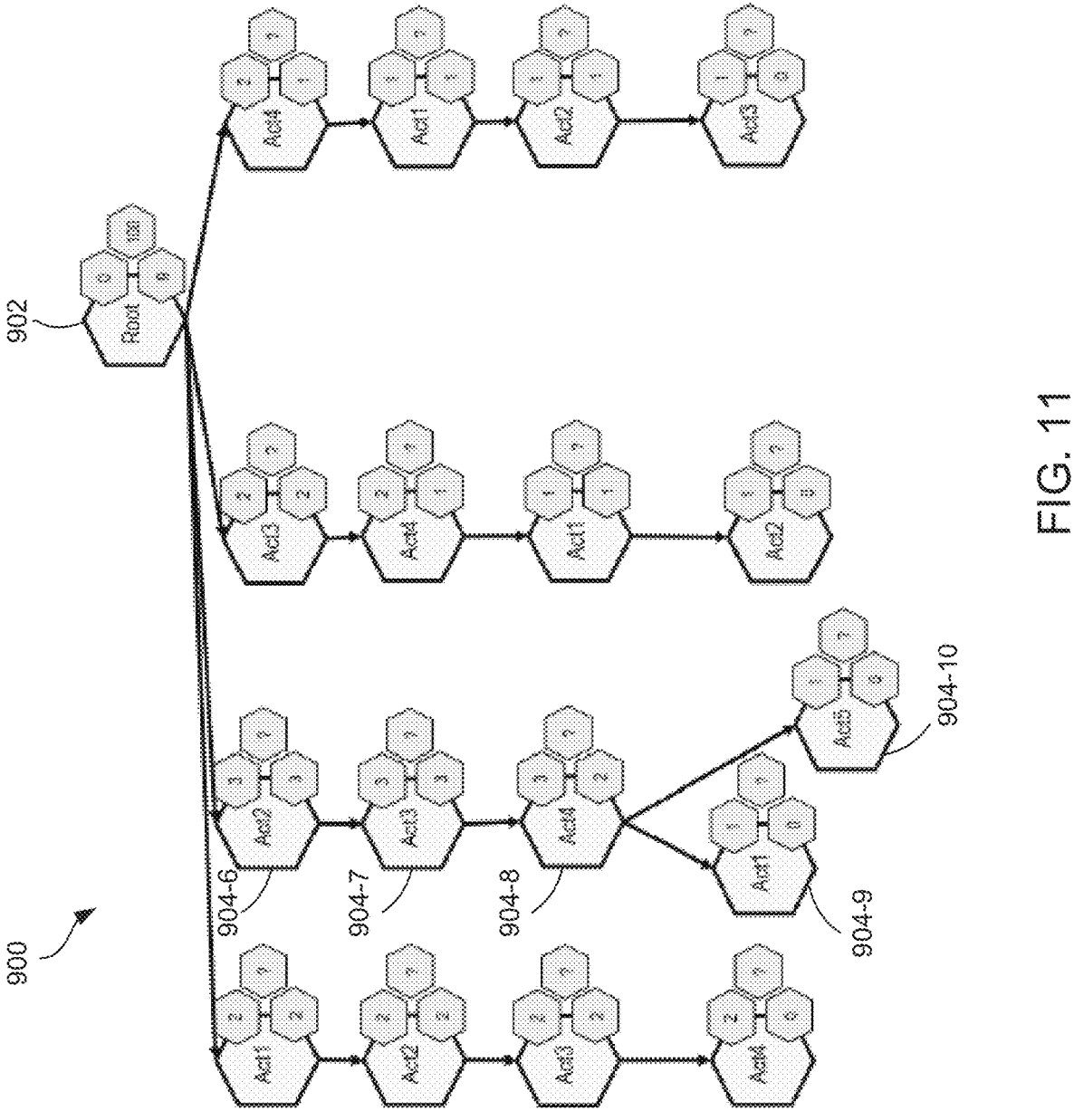
FIG. 11 illustrates the offset well drilling run statistical tree of FIG. 9, at a third stage of building, according to an embodiment.

Referring now to FIG. 11, the fragment 9 is added to the tree 900. Fragment 9 follows an established path from the root node 902 through nodes 904-6 to 904-8 associated with Act2, Act3, and Act4, respectively, but fragment 9 does not end at Act4, nor does it follow the established path to the leaf node 904-9 associated with Act1. Rather, it forms a new sub-sequence, resulting in a second child from the node 904-8 associated with Act4 that leads to a leaf node 904-10 associated with Act5.

This tree-building process continues with the remaining fragments, resulting in the tree 600 of FIG. 6. Once the tree is complete (or possibly during the building phase), the conditional probabilities for the nodes 604, 606 may be calculated. As mentioned above, the conditional probability for a subject node is the frequency of the subject node divided by the total children number of the node that is the parent to the subject node.

Applying the Drilling Activity Distribution Tree to a Drill Plan

Having constructed the tree, the tree may then be applied to an initial drill plan, to fill in any missing drilling activities between sequential activities in the initial drill plan, using the conditional probability of the nodes in the sequences, as represented in the tree. FIG. 12 illustrates a simplified flowchart of a procedure 1200 for applying the tree 600, according to an embodiment.

The procedure 1200 may begin with or otherwise include selecting a subject activity of the initial drill plan, as at 1202. The procedure 1200 may then include selecting a sequence of activities including a prior activity that is prior to the subject activity from a current recommendation, e.g., the prior activity may be immediately prior to the subject activity in the initial drill plan, and may represent the last member of the current recommendation, as at 1204. The procedure 1200 may then include finding a sequence of zero, one, or more activities between the prior activity and the subject activity based on a conditional probability, using the tree 600, as at 1206. In general, this is the application of the tree 600. The procedure 1200 thus considers the sequences of recommended activities (e.g., within the window size established above), and determines, for each sequence within the current recommendation, a path, in the tree 600, from the prior activity to the subject activity. The procedure 1200 then selects one of the paths, for example, the most probable path. In the case that two or more paths have the same probability, a tie-breaker, such as path length or when the sub-pattern is identified, may be used to select one path.

Once a path is selected, the activities that are represented by this path may then be added to the current recommendation, and may follow the prior activity and precede the subject activity therein (the subject activity may also be added to the current recommendation), as at 1208. The current recommendation may also be used to augment the initial drill plan and result in the modified drill plan.

While there is a next subject activity available, the procedure 1200 may loop back to selecting the next subject activity, and iterate through the worksteps 1202-1208 to identify probable sub-patterns and fill in any missing activities. Once the drill plan is established, it may be used as the working drill plan, e.g., from which a well may be drilled, as at 1210.

Figure 13:
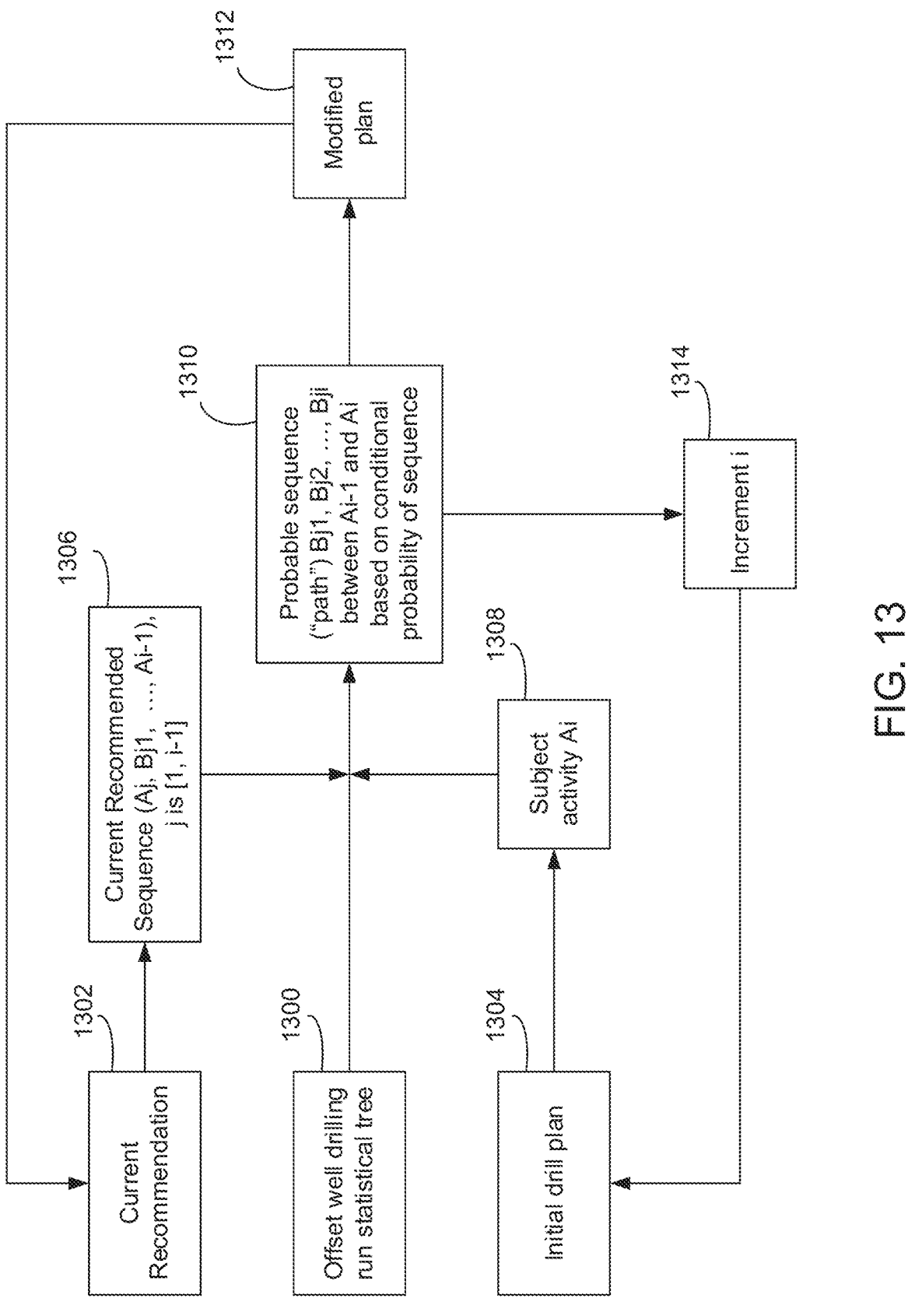
FIG. 13 illustrates a more-detailed flowchart of a procedure for applying the offset-well drilling run statistical tree to modify a drill plan, according to an embodiment.

FIG. 13 illustrates a more-detailed view of a procedure 1300 for applying the tree 600, according to an embodiment. The procedure 1300 may have three inputs: the tree 1300, the current recommendation 1302, and the initial well drill plan 1304. As indicated at 1306, the current recommendation 1302 is a set of one or more recommended sequences. In the case that two or more recommended sequences are provided, the sequences have different lengths, e.g., between 0 and the size of the window used to generate the fragments that built the tree. The recommended sequences terminate at a "prior" activity ($A_{i-1}$) which is earlier in the original sequence provided by the initial drill plan than a "subject" activity Ar. The procedure 1300 is thus aimed at selecting a probable sequence between the prior activity $A_{i-1}$ and the subject activity $A_i$.

Accordingly, the i-th activity $A_i$ (where i represents the number of the iteration that the procedure 1300 is currently running) may be selected from the initial plan 1304, as at 1308. The tree 600 is then applied to determine a probable sequence between the prior activity $A_{i-1}$ and the subject activity $A_i$, as at 1310. If there are any missing or recommended activities between the activities $A_{i-1}$ and $A_i$ (represented as activities ($B_{j1}$, $B_{j2}$, . . . , $B_{ji}$)), then the drill plan is modified at 1312; otherwise, the drill plan is not modified.

The procedure 1300 may then increment i at 1314 and restart the sequence by selecting the next subject activity $A_i$, the next current recommended sequence, etc. The current recommendation may be updated, e.g., to account for the modifications made at 1312.

Thus, by applying the tree 600, one or more new drilling activities ($B_{j1}$, $B_{j2}$, . . . . $B_{ji}$) may be inserted between the prior and subject activities $A_{i-1}$ and $A_i$, which analysis/ insertion may be done for one, some, or all of the activities in the initial drill plan. These new drilling activities may be added to the initial drill plan to result in the modified drill plan.

Figure 14:
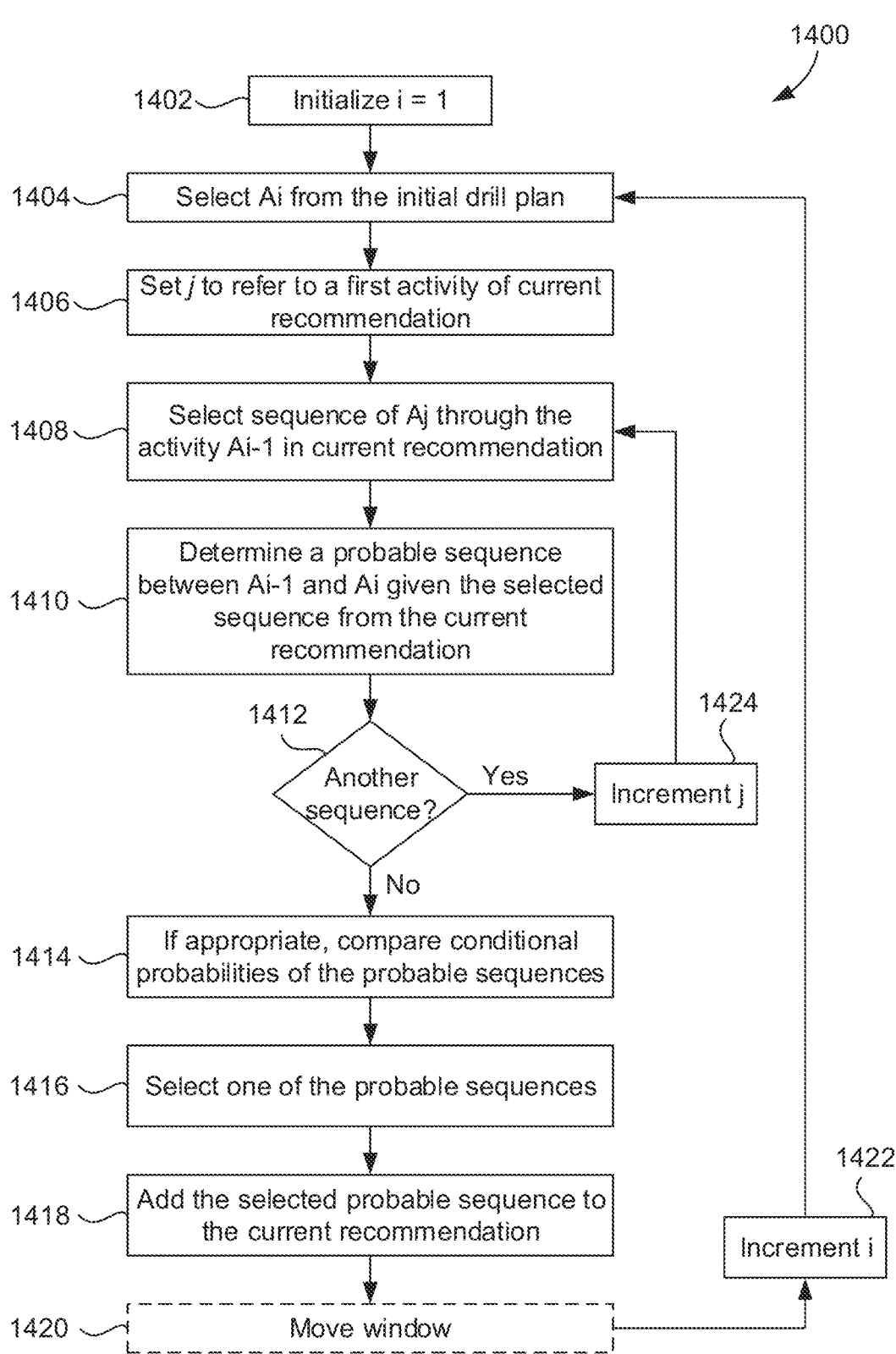
FIG. 14 illustrates a still more-detailed flowchart of a procedure for applying the offset well drilling run statistical tree to modify a drill plan, according to an embodiment.

FIG. 14 provides a more-detailed flowchart of a procedure 1400 for applying the tree 600, according to an embodiment. This embodiment of the procedure 1400 will be described with the additional aid of FIG. 6 which shows the tree 600 as discussed above. In this example, the initial drill plan is set to the following:

Initial Drill Plan: Act3, Act4, Act3, ActX, Act5

A current recommendation is also used. In the initial case, the current recommendation is empty.

Referring again to FIG. 14, a variable i is initialized to 1, as at 1402. Next, the subject activity $A_i$ is selected from the initial drill plan, as at 1404. In this case, $A_i=A_1=Act3$. A variable j is also initialized to reference the first activity of the current recommendation, as at 1406. A sequence of $A_j$ through $A_{i-1}$ is then selected from a current recommendation, as at 1408. In this case, the current recommendation is empty, and thus the sequence $A_i$ through $A_{i-1}$ is also empty.

Accordingly, next, the procedure determines a probable sequence between the prior activity $A_{i-1}$ (the last element of the current recommendation) and the subject activity A (of the initial drill plan) given the selected sequence from the current recommendation, as at 1410. Referring to FIG. 6, in the initial case, the procedure 1400 is thus looking for any missing activities that likely occur before the first activity $A_1$ of the initial drill plan (Act3); that is, between the root node 602 and a node associated with Act3. In this example, node 610-1 is associated with Act3 and is an immediate child of the root node 602, with a conditional probability of 25%. There are other, longer paths to get from the root node 602 to a node also associated with Act3; however, they each have a lower probability than root 602 to node 610-1. For example, another path to Act3 is root 602, node 610-2, node 610-3, but this sequence has a probability of 12.5% (probability of node 610-2\*probability of node 610-3=12.5%\*100%). Thus, the most likely path between the root 602 and a node associated with Act3 proceeds directly to node 610-1. As such, the probable sequence of activities between the prior and subject activities $A_{i-1}$ and $A_i$ is empty.

The procedure 1400 next determines whether there are any additional sequences to consider in the current recommendation (formally, whether j is less than i−1 in the current recommendation), as at 1412. In this case, j and i are equal, so the answer is no, there are no more sequences to consider. The procedure 1400 thus falls out of the initial loop and moves to comparing the conditional probabilities of the probable sequences, as at 1414. In this case, a single probable sequence was identified (the initial loop did not iterate a second time, as will be the case later), thus there is no comparison to be made at 1414. As such, the single probable sequence is selected, as at 1416. This sequence is then "added" to the current recommendation at 1418. Since the sequence is empty, the subject activity $A_i$ is added to the current recommendation.

Next, in some embodiments, the procedure 1400 may move the window for the current recommendation, as at 1420. Specifically, the window of the current recommendation may be tied to the window of the fragments used to build the tree, which may also be the maximum depth of the tree 600. Recall from the discussion of building the tree 600 that the fragment window size was four in this example. The current recommendation is Act3, and thus is one element long. Thus, the window may not be moved at 1420, and this workstep bypassed. The procedure 1400 moves to 1422, where i is incremented by one to a value of two.

Returning to box 1404, the subject activity $A_i$ is now the second activity $A_2$ in the initial drill plan. From the initial drill plan example above, the second activity $A_2$ is Act4. The variable j is set to reference the first element of the current recommendation (j=1 in this case), as at 1406. Next, the sequence of $A_j$ through $A_{i-1}$ is selected from the current recommendation. In the current recommendation, $A_1=Act3$, as previously established. Thus, the sequence to consider from the current recommendation is Act3. Next, the procedure 1400 determines a probable path between a node associated with the prior activity $A_1$ (in the current recommendation) and a node associated with the subject activity $A_2$ (in the initial drill plan); in this example, between Act3 and Act4.

Referring again to FIG. 6, the analysis begins at a node associated with the first activity of the sequence of the current recommendation, which in this case, is also the last activity of the current recommendation and the prior activity, that is, Act3. In the tree 600, this means the analysis begins at node 610-1. The procedure 1400 searches for the most probable path from node 610-1 to a node associated with Act4. In this case, node 610-4 is associated with Act4 and has a conditional probability (given selection of node 610-1) of 100%. No other paths exist in the tree 600 from root 602 to Act3 (taken as a given that there is nothing before Act3, as previously established) to Act4, and thus the probable sequence between $A_{i-1}$ and $A_i$ is again empty. The remainder of the procedure 1400 follows the path discussed above, with the current recommendation now being Act3, Act4.

The value for i is then incremented at 1422 and the procedure returns again to block 1404. The variable i=3, and $A_3$ from the initial drill plan is Act3. The variable j is reset to the first element of the current recommendation (j=1), and one selected sequence from the current recommendation is Act3, Act4. Next, at 1410, the procedure 1400 determines the probable sequence between the last activity in the current recommendation (which is also the prior activity in the initial drill plan) $A_{i-1}$ (Act4) and $A_i$ (Act3) in the initial drill plan.

Referring again to FIG. 6, given the current recommendation that Act3 and Act4 are selected, with nothing before Act3 and nothing between Act3 and Act4, the result is the node 610-4 is where the analysis begins. The path from node 610-4 to a node associated with Act3 is node 610-5 and node 610-6. The conditional probability of this path is 33% (probability of node 610-5×probability of node 610-6=66.7%×50%). No other paths, starting with node 610-4 and ending at a node associated with Act3 are available, and thus the sequence Act3, Act5 is identified.

Referring again to FIG. 14, the procedure 1400 determines whether there are any additional sequences from the current recommendation to consider (e.g., whether j is less than the end of the current recommendation, e.g., i−1). In this case, j=1 and i=3; therefore, the answer is yes. The variable j is then incremented to 2 at 1424, while i remains 3. This provides for a second sequence in the current recommendation, still terminating in the prior activity $A_{i-1}$, to be evaluated. The second sequence is thus different from the first sequence, in that it begins at a different activity (the second activity of the current recommendation rather than the first activity thereof).

Returning to block 1408, the procedure 1400 selects $A_2$ (both j and i–1 are 2, so a single act is selected) from the current recommendation. The second act $A_2$ is Act4. The procedure 1400 then advances to block 1410, using the tree 600 of FIG. 6. The sequence of the current recommendation under consideration is thus root Act4, which results in node 606-1. There are two paths between node 606-1 and a node representing Act3: first, node 606-2, node 606-4, and node 610-7; and second, node 606-3, node 610-8. The conditional probabilities of these two paths are the same: 33%. The procedure 1400 may thus employ a tie-breaker to select one over the other. The tie-breaker may be, for example, the greater length of the identified sequence. Other tie-breakers, such as the order in which the sequence is identified (e.g., giving preference to the first-found), or any other factor or combination of factors, may be employed. The procedure 1400 might also store both paths and employ a tie-breaker later, as will be discussed below. In this case, using the length of the sequence as the tie-breaker, the path 606-2, 606-4, 610-7 is selected, resulting in Act1 and Act2 being between Act4 and Act3.

Returning to FIG. 14, j=2 and i=3; thus j is not less than i–1, meaning there are no additional sequences to consider in the current recommendation, as determined at 1412. Next, at 1414, the conditional probabilities of the identified probable sequences are compared. In the two iterations discussed above, two probable paths were identified for proceeding from Act4 to Act3: Act5 (33%) and Act1, Act2 (33%). Again, a tie-breaker may be applied as part of the comparison at 1414, in this example, preferring longer sequences. Thus, Act1, Act2 is selected as the path from Act4 to Act3. The activities associated with the nodes of this path are then added to the current recommendation, along with $A_i$, following $A_{i-1}$. Thus, the current recommendation becomes: Act3, Act4, Act1, Act2, Act3.

The current recommendation length is now five, which exceeds the window size of four, and thus the window for the current recommendation may be moved, at 1420, such that it contains, for example, one fewer elements than the window size. Thus, the current recommendation becomes Act1, Act2, Act3. It is noted that the value of j that represents the first element may not be 1, since the window moves. Rather, j is selected so that each member of the current recommendation within the window is selected as a starting point for a separate sequence to be applied to the tree 600 to determine probable paths between the prior activity $A_{i-1}$ and the subject activity $A_i$.

The procedure 1400 then increments i to four, at 1422, and returns to block 1404 where the fourth activity $A_4$ from the initial drill plan is then chosen. The fourth activity $A_4$ is ActX, representing an activity that is not in the tree 600. To handle this situation, the procedure 1400 may disregard this activity and proceeds to the next activity $A_5$, which is Act5. The procedure 1400 then determines the probable path between Act3 (last element of current recommendation) and Act5 (next activity of initial drill plan), as discussed above, given three different possible sequences selected from the current recommendation: specifically, a first sequence Act1, Act2, Act3; a second sequence Act2, Act3, and a third sequence Act3. Using the tree 600 and the conditional probabilities, a path from Act3 to Act5, given the different sequences from the current recommendation, may be selected and added to the current recommendation. The unknown activity ActX may then be added back in, immediately before Act5, in the modified drill plan.

Once the current recommendation is complete, e.g., after determining the probable sequence between each of the sequential activities in the initial drill plan, the modified drill plan may be the current recommendation.

Figure 15:
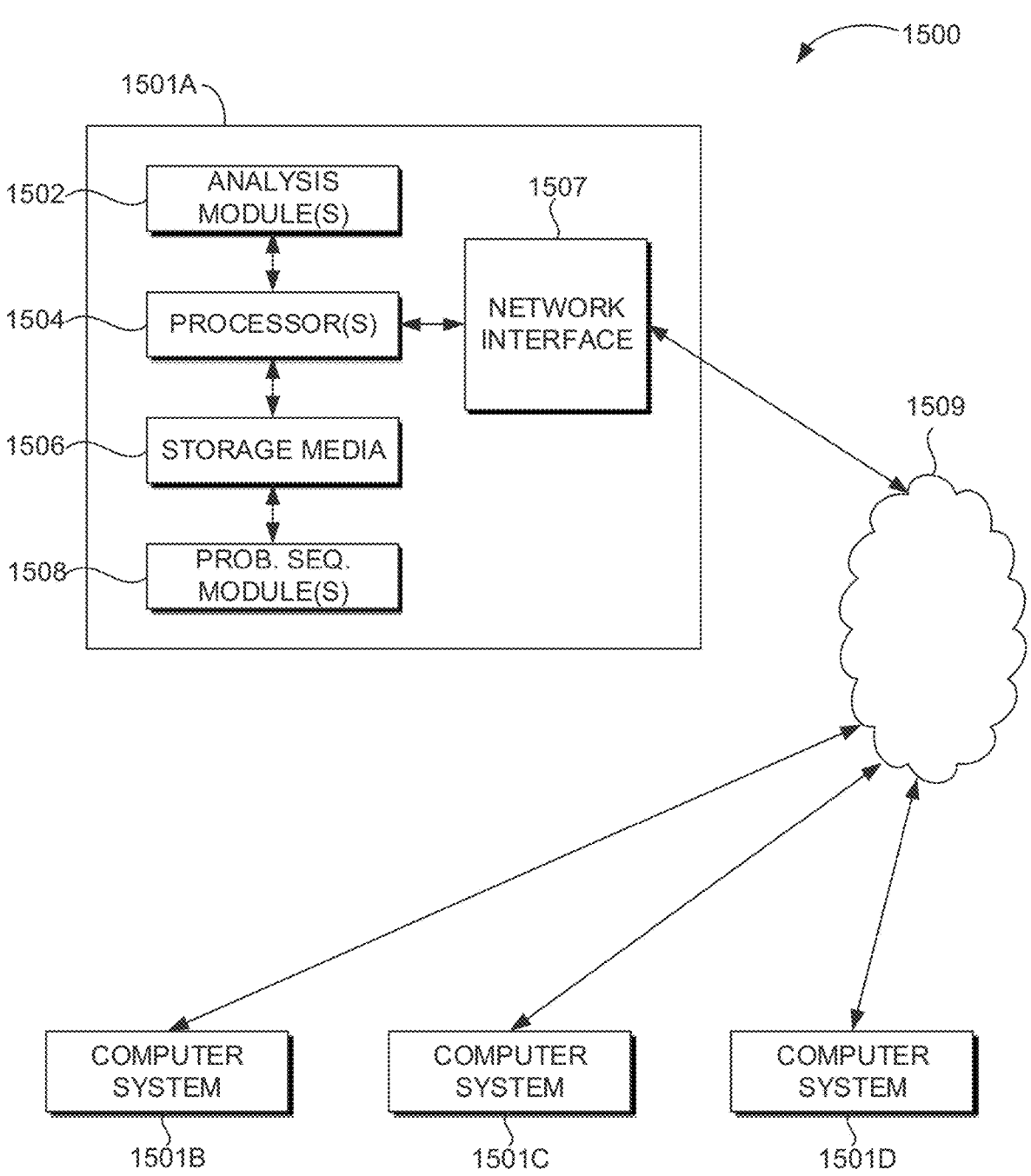
FIG. 15 illustrates a schematic view of a computing system, according to an embodiment.

In some embodiments, the methods of the present disclosure may be executed by a computing system. FIG. 15 illustrates an example of such a computing system 1500, in accordance with some embodiments. The computing system 1500 may include a computer or computer system 1501A, which may be an individual computer system 1501A or an arrangement of distributed computer systems. The computer system 1501A includes one or more analysis modules 1502 that are configured to perform various tasks according to some embodiments, such as one or more methods disclosed herein. To perform these various tasks, the analysis module 1502 executes independently, or in coordination with, one or more processors 1504, which is (or are) connected to one or more storage media 1506. The processor(s) 1504 is (or are) also connected to a network interface 1507 to allow the computer system 1501A to communicate over a data network 1509 with one or more additional computer systems and/or computing systems, such as 1501B, 1501C, and/or 1501D (note that computer systems 1501B, 1501C and/or 1501D may or may not share the same architecture as computer system 1501A, and may be located in different physical locations, e.g., computer systems 1501A and 1501B may be located in a processing facility, while in communication with one or more computer systems such as 1501C and/or 1501D that are located in one or more data centers, and/or located in varying countries on different continents).

A processor may include a microprocessor, microcontroller, processor module or subsystem, programmable integrated circuit, programmable gate array, or another control or computing device.

The storage media 1506 may be implemented as one or more computer-readable or machine-readable storage media. Note that while in the example embodiment of FIG. 15 storage media 1506 is depicted as within computer system 1501A, in some embodiments, storage media 1506 may be distributed within and/or across multiple internal and/or external enclosures of computing system 1501A and/or additional computing systems. Storage media 1506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1500 contains one or more probable sequence determination module(s) 1508. In the example of computing system 1500, computer system 1501A includes the probable sequence determination module 1508. In some embodiments, a single probable sequence determination module may be used to perform some aspects of one or more embodiments of the methods disclosed herein. In other embodiments, a plurality of probable sequence determination modules may be used to perform some aspects of methods herein.

It should be appreciated that computing system 1500 is merely one example of a computing system, and that computing system 1500 may have more or fewer components than shown, may combine additional components not depicted in the example embodiment of FIG. 15, and/or computing system 1500 may have a different configuration or arrangement of the components depicted in FIG. 15. The various components shown in FIG. 15 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1500, FIG. 15), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for planning a well, the method comprising:
receiving: an initial drill plan including an initial sequence of activities; an offset well drilling run statistical tree; and a current recommendation of one or more sequences of activities for drilling a target well;
analyzing the initial drill plan;
iteratively, from an earliest subject activity to a latest subject activity of the initial sequence of activities of the initial drill plan:

selecting a respective subject activity of the initial sequence of activities of the initial drill plan;
analyzing the current recommendation of the one or more sequences of activities;
selecting a sequence of activities of the one or more sequences of activities that terminates at a prior activity that is prior to the subject activity, wherein the prior activity comprises the respective subject activity of a previous iteration;
determining a sequence of activities including the prior activity, the subject activity, and one or more drilling activities that occur between the prior activity and the subject activity that are determined based on a conditional probability of an occurrence of the one or more drilling activities in the offset well drilling run statistical tree,
wherein the offset well drilling run statistical tree is based on one or more offset well drilling activity logs and includes probabilities for activities in sequences of drilling activities, and
wherein the determining the one or more drilling activities includes determining a most probable path between the prior activity and the subject activity in the offset well drilling run statistical tree;
analyzing the determined sequence of the activities;
adding the determined sequence of activities to the current recommendation; and
augmenting the sequence of activities of the initial drill plan based on the determined sequence of activities to generate a modified drill plan for drilling the target well, wherein the modified drill plan includes the augmented sequence of activities; and
drilling the target well, by an automated well drilling system, according to the augmented sequence of activities of the modified drill plan, wherein the drilling comprises:
performing the prior activity;
performing the one or more drilling activities after performing the prior activity; and
performing the subject activity after performing the one or more drilling activities.

2. The method of claim 1, wherein the offset well drilling run statistical tree is constructed by portioning the one or more offset well drilling activity logs into fragments.

3. The method of claim 2, wherein a sequence of one or more activities of the offset well drilling activity logs is parsed into the fragments, wherein a window size of a particular number of activities is utilized, and wherein the sequence of the one or more activities is analyzed based on the window size.

4. The method of claim 3, wherein nodes are extracted from the fragments and used to build the offset well drilling run statistical tree.

5. The method of claim 4, wherein the most probable path is determined based on an association of root nodes and leaf nodes of the offset well drilling run statistical tree.

6. The method of claim 1, wherein the drilling the target well is by an automated well drilling system.

7. The method of claim 1, wherein:
the offset well drilling run statistical tree is constructed by portioning the one or more offset well drilling activity logs into fragments;
a sequence of one or more activities of the offset well drilling activity logs is parsed into the fragments;
a window size of a particular number of activities is utilized, and wherein the sequence of the one or more activities is analyzed based on the window size;

nodes are extracted from the fragments and used to build the offset well drilling run statistical tree;

the most probable path is determined based on an association of root nodes and leaf nodes of the offset well drilling run statistical tree; and the drilling the target well is by an automated well drilling system.

8. The method of claim 7, wherein each node represents data representing:

a frequency representing a total number of times the node appears in sequence in the fragments;

a number of children of the node, wherein the number of children is the number of times the node appears in sequence in, but is not the last node of, the fragments; and a probability representing the frequency of the node divided by the number of children of a parent node of the node.

9. A system for planning a well, the system comprising:
one or more processors; and a memory system including one or more non-transitory, computer-readable media storing instructions that, when executed by at least one of the one or more processors, cause a computing system to perform operations, the operations comprising:

receiving: an initial drill plan including an initial sequence of activities; an offset well drilling run statistical tree; and a current recommendation of one or more sequences of activities for drilling a target well;

analyzing the initial drill plan;

iteratively, from an earliest subject activity to a latest subject activity of the initial sequence of activities of the initial drill plan:

selecting a respective subject activity of the initial sequence of activities of the initial drill plan;

analyzing the current recommendation of the one or more sequences of activities;

selecting a sequence of activities of the one or more sequences of activities that terminates at a prior activity that is prior to the subject activity, wherein the prior activity comprises the respective subject activity of a previous iteration;

determining a sequence of activities including the prior activity, the subject activity, and one or more drilling activities that occur between the prior activity and the subject activity that are determined based on a conditional probability of an occurrence of the one or more drilling activities in the offset well drilling run statistical tree, wherein the offset well drilling run statistical tree is based on one or more offset well drilling activity logs and includes probabilities for activities in sequences of drilling activities, and wherein the determining the one or more drilling activities includes determining a most probable path between the prior activity and the subject activity in the offset well drilling run statistical tree;

analyzing the determined sequence of the activities;

adding the determined sequence of activities to the current recommendation; and augmenting the sequence of activities of the initial drill plan based on the determined sequence of activities to generate a modified drill plan for drilling the target well, wherein the modified drill plan includes the augmented sequence of activities; and drilling, by an automated well drilling system, according to the augmented sequence of activities of the modified drill plan, wherein the drilling comprises:

performing the prior activity;

performing the one or more drilling activities after performing the prior activity; and performing the subject activity after performing the one or more drilling activities.

10. The system of claim 9, wherein the offset well drilling run statistical tree is constructed by portioning the one or more offset well drilling activity logs into fragments.

11. The system of claim 10, wherein a sequence of one or more activities of the offset well drilling activity logs is parsed into the fragments, wherein a window size of a particular number of activities is utilized, and wherein the sequence of the one or more activities is analyzed based on the window size.

12. The system of claim 11, wherein nodes are extracted from the fragments and used to build the offset well drilling run statistical tree.

13. The system of claim 12, wherein the most probable path is determined based on an association of root nodes and leaf nodes of the offset well drilling run statistical tree.

14. The system of claim 9, wherein the drilling the target well is by an automated well drilling system.

15. A non-transitory computer-readable storage medium storing instructions that when executed by a computer, which includes a processor performs a method, the method comprising:

receiving: an initial drill plan including an initial sequence of activities; an offset well drilling run statistical tree; and a current recommendation of one or more sequences of activities for drilling a target well;

analyzing the initial drill plan;

iteratively, from an earliest subject activity to a latest subject activity of the initial sequence of activities of the initial drill plan:

selecting a respective subject activity of the initial sequence of activities of the initial drill plan;

analyzing the current recommendation of the one or more sequences of activities;

selecting a sequence of activities of the one or more sequences of activities that terminates at a prior activity that is prior to the subject activity, wherein the prior activity comprises the respective subject activity of a previous iteration;

determining a sequence of activities including the prior activity, the subject activity, and one or more drilling activities that occur between the prior activity and the subject activity that are determined based on a conditional probability of an occurrence of the one or more drilling activities in the offset well drilling run statistical tree, wherein the offset well drilling run statistical tree is based on one or more offset well drilling activity logs and includes probabilities for activities in sequences of drilling activities, and wherein the determining the one or more drilling activities includes determining a most probable path between the prior activity and the subject activity in the offset well drilling run statistical tree;

analyzing the determined sequence of the activities;

adding the determined sequence of activities to the current recommendation; and augmenting the sequence of activities of the initial drill plan based on the determined sequence of activities to generate a modified drill plan for drilling the target well, wherein the modified drill plan includes the augmented sequence of activities; and drilling, by an automated well drilling system, according to the augmented sequence of activities of the modified drill plan, wherein the drilling comprises:

performing the prior activity;

performing the one or more drilling activities after performing the prior activity; and performing the subject activity after performing the one or more drilling activities.

16. The non-transitory computer-readable storage medium of claim 15, wherein the drilling the target well is by an automated well drilling system.

17. The non-transitory computer-readable storage medium of claim 15, wherein the offset well drilling run statistical tree is constructed by portioning the one or more offset well drilling activity logs into fragments.

* * * * *